(12) United States Patent
Wang et al.

(10) Patent No.: US 8,954,397 B2
(45) Date of Patent: Feb. 10, 2015

(54) CREATION AND REPLAY OF A SIMULATION WORKLOAD USING CAPTURED WORKLOADS

(75) Inventors: Yujun Wang, Los Gatos, CA (US); Leonidas Galanis, San Jose, CA (US); Konstantinos Morfonios, Foster City, CA (US); Karl Dias, Foster City, CA (US); John Mark Beresniewicz, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 63 days.

(21) Appl. No.: 13/538,278

(22) Filed: Jun. 29, 2012

(65) Prior Publication Data
US 2014/0006358 A1 Jan. 2, 2014

(51) Int. Cl.
*G06F 7/00* (2006.01)

(52) U.S. Cl.
USPC .......................................... 707/687; 707/899

(58) Field of Classification Search
CPC ............ G06F 11/3414; G06F 11/3433; G06F 17/30306
USPC .......................... 707/687, 609, 769, 821, 899
See application file for complete search history.

(56) References Cited

U.S. PATENT DOCUMENTS

| | | | |
|---|---|---|---|
| 5,977,890 A | 11/1999 | Rigoutsos et al. | |
| 6,253,228 B1 | 6/2001 | Ferris et al. | |
| 6,775,826 B1 | 8/2004 | Zahavi et al. | |
| 7,426,513 B2 | 9/2008 | Gvily | |
| 7,512,877 B2 | 3/2009 | Aoki | |
| 7,519,527 B2 * | 4/2009 | Lau et al. | 703/21 |
| 7,818,746 B2 * | 10/2010 | Anderson | 718/102 |
| 7,890,457 B2 * | 2/2011 | Dias et al. | 707/610 |
| 7,890,458 B2 * | 2/2011 | Dias et al. | 707/610 |
| 7,984,015 B2 * | 7/2011 | Dias et al. | 707/610 |
| 8,024,299 B2 * | 9/2011 | Dias et al. | 707/660 |
| 8,230,002 B2 * | 7/2012 | Wang et al. | 709/203 |
| 8,336,054 B2 * | 12/2012 | Cherkasova et al. | 718/104 |
| 8,352,240 B2 * | 1/2013 | Chow et al. | 703/26 |
| 8,370,386 B1 | 2/2013 | Wang et al. | |
| 8,418,150 B2 | 4/2013 | Thirumalai et al. | |
| 8,433,680 B2 * | 4/2013 | Ling et al. | 707/615 |
| 8,442,941 B2 * | 5/2013 | Yao et al. | 707/610 |
| 8,490,087 B2 * | 7/2013 | Beaty et al. | 718/1 |
| 8,510,406 B2 | 8/2013 | Kembel et al. | |
| 8,516,361 B2 | 8/2013 | Tatsubori et al. | |

(Continued)

OTHER PUBLICATIONS

Rajeev, "Consolidated database replay", dbaStreet, May 23, 2012, 2 pages, accessed online at <http://dbastreet.com/blog/?tag=database-replay> on Nov. 5, 2013.*

(Continued)

*Primary Examiner* — Phuong Thao Cao
(74) *Attorney, Agent, or Firm* — Hickman Palermo Truong Becker Bingham Wong LLP

(57) ABSTRACT

A method for replaying a simulation workload is provided. The simulation workload identifies a plurality of workload parts. Each workload part is at least a portion of a respective captured workload. In an embodiment, a first workload part is a portion of a first workload executed relative to a first capture database server and a second workload part is a portion of a second workload executed relative to a second capture database server. A portion of the first workload part and a portion of the second workload part may be replayed concurrently.

24 Claims, 5 Drawing Sheets

(56) References Cited

U.S. PATENT DOCUMENTS

| | | | |
|---|---|---|---|
| 2002/0103858 A1 | 8/2002 | Bracewell et al. | |
| 2002/0198984 A1* | 12/2002 | Goldstein et al. | 709/224 |
| 2003/0053420 A1* | 3/2003 | Duckett et al. | 370/252 |
| 2003/0061569 A1 | 3/2003 | Aoki | |
| 2003/0163608 A1* | 8/2003 | Tiwary et al. | 710/1 |
| 2003/0172091 A1 | 9/2003 | Norcott | |
| 2003/0172198 A1* | 9/2003 | Tiwary et al. | 710/1 |
| 2004/0015600 A1* | 1/2004 | Tiwary et al. | 709/234 |
| 2004/0221115 A1* | 11/2004 | Sahin et al. | 711/154 |
| 2005/0131879 A1 | 6/2005 | Ghosh et al. | |
| 2005/0186975 A1 | 8/2005 | Yach et al. | |
| 2006/0041685 A1 | 2/2006 | Bracewell et al. | |
| 2006/0230317 A1* | 10/2006 | Anderson | 714/38 |
| 2007/0112549 A1* | 5/2007 | Lau et al. | 703/13 |
| 2007/0277108 A1 | 11/2007 | Orgill et al. | |
| 2008/0022282 A1* | 1/2008 | Cherkasova et al. | 718/102 |
| 2008/0097960 A1* | 4/2008 | Dias et al. | 707/2 |
| 2008/0097961 A1* | 4/2008 | Dias et al. | 707/2 |
| 2008/0097995 A1* | 4/2008 | Dias et al. | 707/8 |
| 2008/0097996 A1* | 4/2008 | Dias et al. | 707/8 |
| 2008/0098003 A1* | 4/2008 | Dias et al. | 707/10 |
| 2008/0162411 A1* | 7/2008 | Buckler et al. | 707/2 |
| 2008/0177824 A1* | 7/2008 | Wang et al. | 709/203 |
| 2009/0100082 A1* | 4/2009 | Kogan et al. | 707/101 |
| 2009/0106321 A1 | 4/2009 | Das et al. | |
| 2009/0319256 A1* | 12/2009 | Chow et al. | 703/26 |
| 2010/0005097 A1* | 1/2010 | Liang et al. | 707/8 |
| 2010/0251031 A1* | 9/2010 | Nieh et al. | 714/45 |
| 2010/0257513 A1* | 10/2010 | Thirumalai et al. | 717/134 |
| 2010/0299176 A1 | 11/2010 | Mangipudi et al. | |
| 2011/0131589 A1* | 6/2011 | Beaty et al. | 719/318 |
| 2011/0225569 A1* | 9/2011 | Beaty et al. | 717/127 |
| 2011/0276550 A1* | 11/2011 | Colle et al. | 707/705 |
| 2011/0295801 A1* | 12/2011 | Dias et al. | 707/622 |
| 2012/0005174 A1* | 1/2012 | Vora | 707/703 |
| 2012/0005175 A1* | 1/2012 | Vora | 707/703 |
| 2012/0054245 A1* | 3/2012 | Colle et al. | 707/792 |
| 2012/0143588 A1* | 6/2012 | Liu et al. | 703/22 |
| 2012/0158723 A1* | 6/2012 | Wu et al. | 707/737 |
| 2012/0185430 A1* | 7/2012 | Yao et al. | 707/617 |
| 2012/0233625 A1* | 9/2012 | Sabin et al. | 718/105 |
| 2013/0136253 A1* | 5/2013 | Liberman Ben-Ami et al. | 379/265.09 |
| 2013/0191723 A1 | 7/2013 | Pappas et al. | |
| 2013/0205010 A1* | 8/2013 | Gupta et al. | 709/224 |
| 2013/0311642 A1 | 11/2013 | Morfonios | |
| 2013/0339964 A1* | 12/2013 | Cotner et al. | 718/102 |

OTHER PUBLICATIONS

Yujun Wang et al., "Real Application Testing with Database Relay", 2009, 6 pages.

Leonidas Galanis et al., "Oracle Database Replay", 2008, 12 pages.

Inderpal S. Johal, "Oracle 11g Database Relay", 2007, 38 pages.

* cited by examiner

CREATION AND REPLAY OF A SIMULATION WORKLOAD USING CAPTURED WORKLOADS

CROSS-REFERENCE TO RELATED APPLICATIONS AND PATENTS

The present application is related to (1) application Ser. No. 13/034,526, filed Feb. 24, 2011, entitled "Transactionally Consistent Replay Of Application Workload," (2) application Ser. No. 13/475,514 filed on May 18, 2012 entitled "Automated Discovery of Template Patterns Based on Received Server Requests," (3) U.S. Pat. No. 7,890,457 B2, filed May 3, 2007, entitled "Transactionally Consistent Database Workload Replay, (4) application Ser. No. 11/800,240, filed May 3, 2007, entitled "Database Workload Replay Remapping Infrastructure," (5) application Ser. No. 12/775,322, filed May 6, 2010, entitled "Fine Grain Synchronization For Database Replay," (6) application Ser. No. 12/870,736, filed Aug. 27, 2010, entitled "Transactionally Consistent Database Replay In An Environment With Connection Pooling," (7) application Ser. No. 13/076,313, filed Mar. 30, 2011, entitled "Application Workload Capture And Replay System," and (8) application Ser. No. 13/207,763, filed Aug. 11, 2011, entitled "Filtering Workload For Database Replay." The contents of all patent applications and patents cited in this paragraph are incorporated by reference.

FIELD OF THE INVENTION

The present invention relates to databases, and in particular, to creating and replaying simulation workloads to a database system.

BACKGROUND

Database Systems

A database management system ("DBMS") manages a database. A database management system may comprise one or more database servers that manage access to the database. A database comprises database data and metadata that is stored on a persistent memory mechanism, such as a set of hard disks. Metadata defines or describes database objects.

Database applications and clients interact, directly or indirectly, with database instances by submitting database commands that cause the database instances to perform operations on data stored in a database by executing the commands relative to the database. A database command may be in the form of a database statement that conforms to a database language. One example language for expressing database workload units is the Structured Query Language (SQL). There are many different versions of SQL. Some versions are standard, and some are proprietary. There are also a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not limited to any particular version of SQL or to any particular form of database command.

Testing and Validating a Database System

Large business-critical applications are complex and experience highly varying load and usage patterns. These applications are expected to provide certain service guarantees in terms of response time, throughput, uptime, and availability. At times, it may be desirable to change a system that includes such applications. Such a change might involve upgrading the system's database server code or modifying a configuration, for example. However, before any change is made to a system, extensive testing and validation should be performed. In order to be confident that a change does not cause problems (e.g., errors or performance issues) in the system once that change is introduced into the system, a system tester exposes the system to be changed ("test system") to a workload that simulates the workload of one or more other systems in a real world environment.

Under a Database Workload Capture and Replay architecture developed by Oracle, Inc., as described in the Workload Capture and Replay applications that have been incorporated by reference herein, a workload is captured at a capture database system, processed, and replayed at a test database system. The approach of capturing actual database workloads and replaying them has been able to adequately replicate a real captured workload in a test system in some cases. However, prior approaches of using workload replay of a captured workload to test a test system were better suited for testing a test system that is highly similar to the capture system upon which the workload was captured. What is needed is an approach that adequately replicates a real captured workload on a test system with workload conditions that are different than the conditions of the captured workload.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
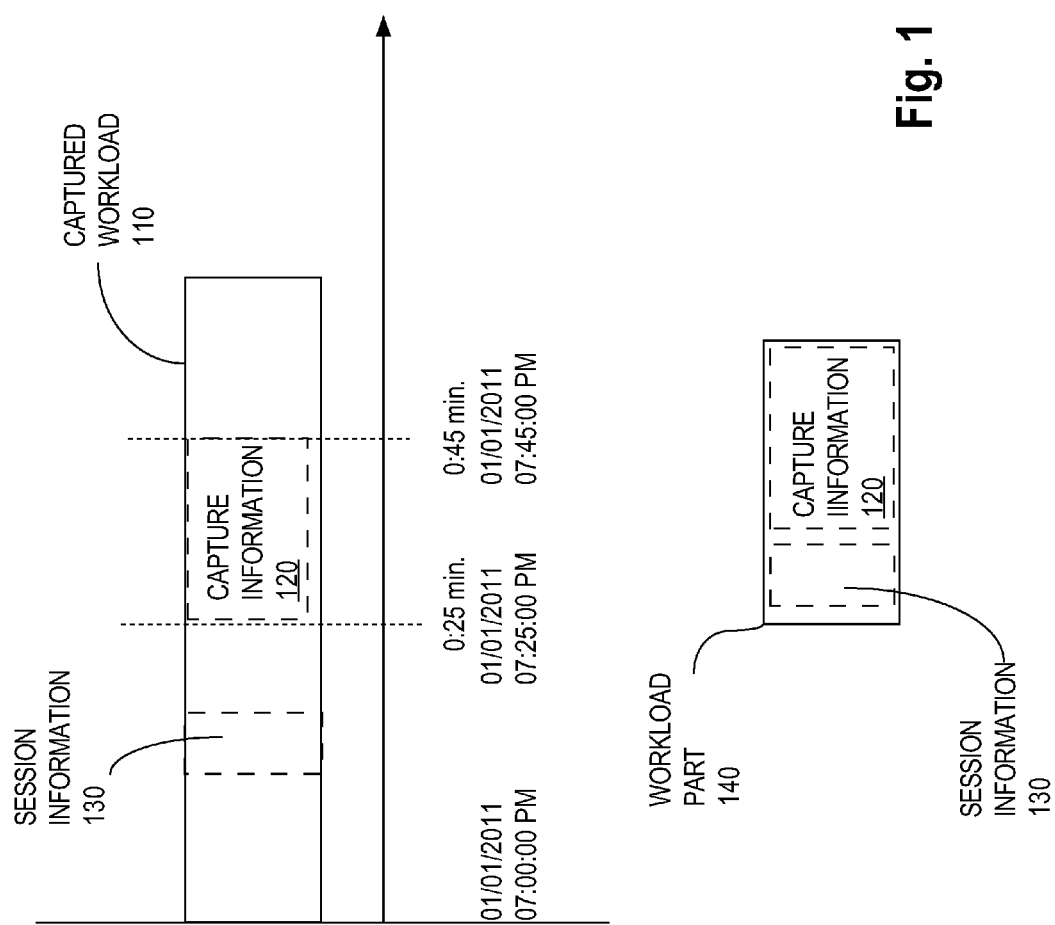
FIG. 1 is a block diagram illustrating an embodiment of a workload part that corresponds to a specified interval of capture time.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for creating and replaying a simulation workload. The techniques described herein may be implemented by specially configuring one or more computing devices to perform the techniques. In one embodiment, sequences of instructions for performing the techniques may be stored on one or more non-transitory computer-readable storage media. The techniques may be accomplished when the stored instructions are executed by one or more computing devices.

In an embodiment, during a capture phase, an actual application workload is captured. A simulation workload is created that identifies a plurality of workload parts, where each workload part is at least a portion of a respective captured workload. The simulation workload is replayed. In an embodiment, a first workload part is a portion of a first workload executed relative to a first capture database server and a second workload part is a portion of a second workload executed relative to a second capture database server. Replaying the simulation workload comprises replaying at least a portion of the first workload part and a portion of the second workload part concurrently.

In another embodiment, the plurality of workload parts comprises a first workload part that is a first portion of a particular captured workload executed relative to a capture database server and a second workload part that is a second portion of the particular captured workload. The second workload part is different from the first workload part. The portion of the second workload part was executed relative to the capture database server before the portion of the first workload part was executed relative to the capture database server. The simulation workload indicates that the first workload part is to be replayed before the second workload part.

Capturing a Workload

The applications identified above, which have been incorporated by reference herein, describe techniques for capturing a workload. A captured workload is the workload that a particular database server receives from external entities, which has been captured and recorded by a capture process. External entities may include application servers or other kinds of clients. The captured workload may comprise workload that was captured during a specified interval of time, the specified interval of time referred to herein as a "recording interval."

The captured workload includes discrete, independently meaningful units called "workload units." In an embodiment, each workload unit represents a separate user request originating from a client or an application server. In an embodiment, each workload unit represents a separate SQL statement.

In one embodiment of the invention, the information stored in the captured workload includes information that is sufficient to allow a transactionally consistent replay of the captured workload to be performed relative to a different system (a "replay system") than the system at which the workload was captured (a "capture system"). Such information allows the replay database system to be subjected to a workload that is practically indistinguishable from the workload to which the capture system was originally subjected. Captured workloads may also include information that describes database commands and state values that represent states of the capture database in which the database commands were executed. In one embodiment of the invention, the captured workload includes five main kinds of information: SQL and PL/SQL workload, non-SQL workload, transactional data, workload unit context, and special function instrumentation. However, in various alternative embodiments of the invention, workload may include additional, fewer, or different kinds of data than those expressly described herein.

Simulation Workload

In an embodiment, portions of one or more captured workloads are selected to be included in a simulation workload. A simulation workload identifies a plurality of workload parts that are to be replayed to a database system, where each workload part is a portion of a captured workload. Each workload part includes one or more workload units.

A simulation workload may contain references to the various workload parts included in the simulation workload. A reference to a workload part may point to a particular location in a captured workload that corresponds to a workload part of the simulation workload. For example, the reference may point to a workload unit of the captured workload that is the first workload unit in a sequence of plurality of workload units to be included in the workload part. In another embodiment, the simulation contains workload units that are copied over from a captured workload.

In an embodiment, a simulation workload is stored in one or more binary files. In response to a portion of a captured workload being selected to be included in a simulation workload, the portion of the captured workload may be copied over to a simulation workload file. In another embodiment, the simulation workload is stored in appropriate database tables.

Each workload part identifies one or more workload units to be included in the workload part. There may be one or more files, or one or more portions of files, representing a workload part and those files or file portions may include references to one or more workload units included in the workload part. In another embodiment, a workload part is one or more files or one or more file portions containing workload units that have been copied over from a captured workload.

A workload part is herein referred to as including the workload units that are either referenced in one or more files or one or more file portions representing the workload part, or are copied over to be included in a file or file portion representing the workload part. A simulation workload is herein referred to as including the workload parts that are either referenced in the files representing the workload part, or are copied over to be included in the files representing the workload part.

The simulation workload may indicate an order in which each of the workload parts is to be replayed. For example, Workload Part X may be scheduled to begin playing at the time that the replay of Workload W ends. Alternatively, Workload Part X may be scheduled to begin playing at the same time as Workload Part X. The simulation workload may also indicate the timing of the replay. For example, the simulation workload may indicate that Workload Part X is to begin playing 20 seconds after the time at which the replay of Workload Part W ends.

The simulation workload may indicate when the replay of the simulation workload is to end. In an embodiment, the replay is scheduled to end at the time that a particular workload part of the simulation workload concludes replaying. In another embodiment, the replay is scheduled to end at the time that the last of the plurality of workload parts of the simulation workload has concluded playing. In another embodiment, a simulation workload is scheduled to conclude at a particular clock time, e.g. at 21:00:00 PM on Jan. 1, 2015 or at a particular amount of time after the beginning of the simulation workload, e.g. twenty minutes after the beginning of the replay of the simulation workload.

Workload Parts

Each workload part is at least a portion of a captured workload. The workload part may include the entire captured workload or may include only a part of the captured workload. A workload part may include only the portion of a captured workload that was captured during a specified interval of time, where the specified interval of time is within the recording interval of the captured workload. For example, a workload part may include the portion of the captured workload that corresponds to 30 minutes of capture, where the 30 minute long capture period begins 15 minutes after the start of the capture.

A workload part that corresponds to a particular specified interval of capture time may include additional information that was recorded outside the specified interval of capture time. The additional information may include session information such as recorded session operations, session state information, or other recorded information necessary to re-create a session that was open during the specified interval of the capture. Session operations may include operations such as user authentication, logon, logoff, and session switch. The session information may comprise authentication information such as a username that may be necessary to replay a workload unit that comprises a user logging into a session. The session information may also comprise all session attributes that are necessary to recreate session operations. In an embodiment, the additional information, e.g. session information, is replayed immediately before the portion of the captured workload that was recorded in the specified interval of capture time.

FIG. 1 is a block diagram illustrating an embodiment of a workload part that corresponds to a specified interval of capture time. Workload part 140 is a portion of captured workload 110. Workload part 140 is the workload part that corresponds to twenty minutes of capture recorded in captured workload 110, beginning at twenty-five minutes after the beginning of the recoding interval of captured workload 110. Workload part 140 may be created in response to determining that a simulation workload is to simulate, in part, twenty minutes of the workload captured in captured workload 110, beginning at twenty-five minutes after the beginning of the recording interval.

In response to the determination, workload part 140 is created. Workload part 140 includes capture information 120. Capture information 120 is a portion of captured workload 110. Capture information 120 includes the workload received by the capture database server between 7:25 PM and 7:45 PM, where the capture database server is the database server that received the workload captured in captured workload 110. Workload part 140 also includes session information 130. Session information 130 includes session information for a session that was open during the specified interval of 7:25 PM to 7:45 PM. For example, a user may have performed an operation while logged in during the specified interval of 7:25 PM to 7:45 PM. Capture information 120 would have captured the performance of the operation. However, the user may have logged in prior to 7:25 PM, thus capture information 120 would not include workload corresponding to the user logging in. Session information 130 may include workload corresponding to the user logging in, for example, a user logon request and the corresponding authentication information for the logon request, such as the user's username. Workload part 140 would be created, and workload part 140 includes session information 130 and capture information 120. Workload part 140 is ordered such that session information 130 is before capture information 120 in the ordering of workload part 140. When workload part 140 is replayed, session information 130 is replayed before capture information 120.

Workload part 140 may be created in response to determining that a simulation workload is to simulate, in part, twenty minutes of the workload captured in captured workload 110, beginning at twenty-five minutes after the beginning of the recording interval. The determination may have been made automatically or by a user. The determination to include session information 130 in workload part 140 may have occurred automatically in response to determining that a workload part corresponding to the specified interval of capture time is to be created. Workload part 140 may be one part of a simulation workload comprising other workload parts.

A workload part may include only some types of captured data. The creation of a workload part may include filtering out certain types of information contained in a captured workload. The information that is to be filtered out may vary according to different embodiments.

In an embodiment, a workload part includes only the captured workload information that is necessary to replay captured operation of a particular type. For example, a workload part may include only the captured data that is necessary to replay each of the update operations captured in a particular captured workload. In an embodiment, the necessary information includes each request to read information stored in the captured database system during a specified interval and also additional session information necessary to replay each of the read requests.

In an embodiment, a workload part is created based on a captured workload by removing all operations of a particular type. For example, a workload part may be created by removing each update request from the captured information.

In an embodiment, the captured workload comprises SQL text, and a workload part includes the contents of the captured workload with certain workload units removed. The determination of whether a certain workload unit is to be removed may be based on the SQL text that is included in the workload unit. For example, a workload part may include the contents of the captured workload, except that each workload unit comprising the SQL text "SELECT" is removed.

In an embodiment, a portion of a captured workload is determined to be included or not included in a workload part based on attributes of the entity from which the requests contained in the workload part originate. For example, workload units may be filtered out or selected to be included in a workload part based on the client or application server that sends the captured request included in a workload unit. Workload units may also be filtered out, or selected to be included in a workload part, based on the user that requested the performance of an operation included in the workload unit. In an embodiment, workload units may be filtered out, or selected to be included in a workload part, based on which part of an application a request contained in the workload unit originates from. For example, there may be modules defined in the application, and information contained in the workload may indicate the module from which a particular request originated from. Workload units may be filtered out, or selected to be included in a workload part, based on the module of the application from which a request contained in the workload unit originated from.

In an embodiment, one or more workload units included in a workload capture file are associated with a particular service. A workload unit may be assigned to a particular service if a request contained in the workload unit was sent while the sender of the request was connected to the particular service. The sender of the request may be a particular application, client, or user.

The determination of whether a workload unit is included in a workload part may be based on the service a request included in the workload unit is associated with. For example, in an embodiment, a workload part includes only the portions of a workload that are associated with a particular service. In another embodiment, a workload part filters out portions of a captured workload that are associated with a particular service.

Example Simulation Workloads

Figure 2:
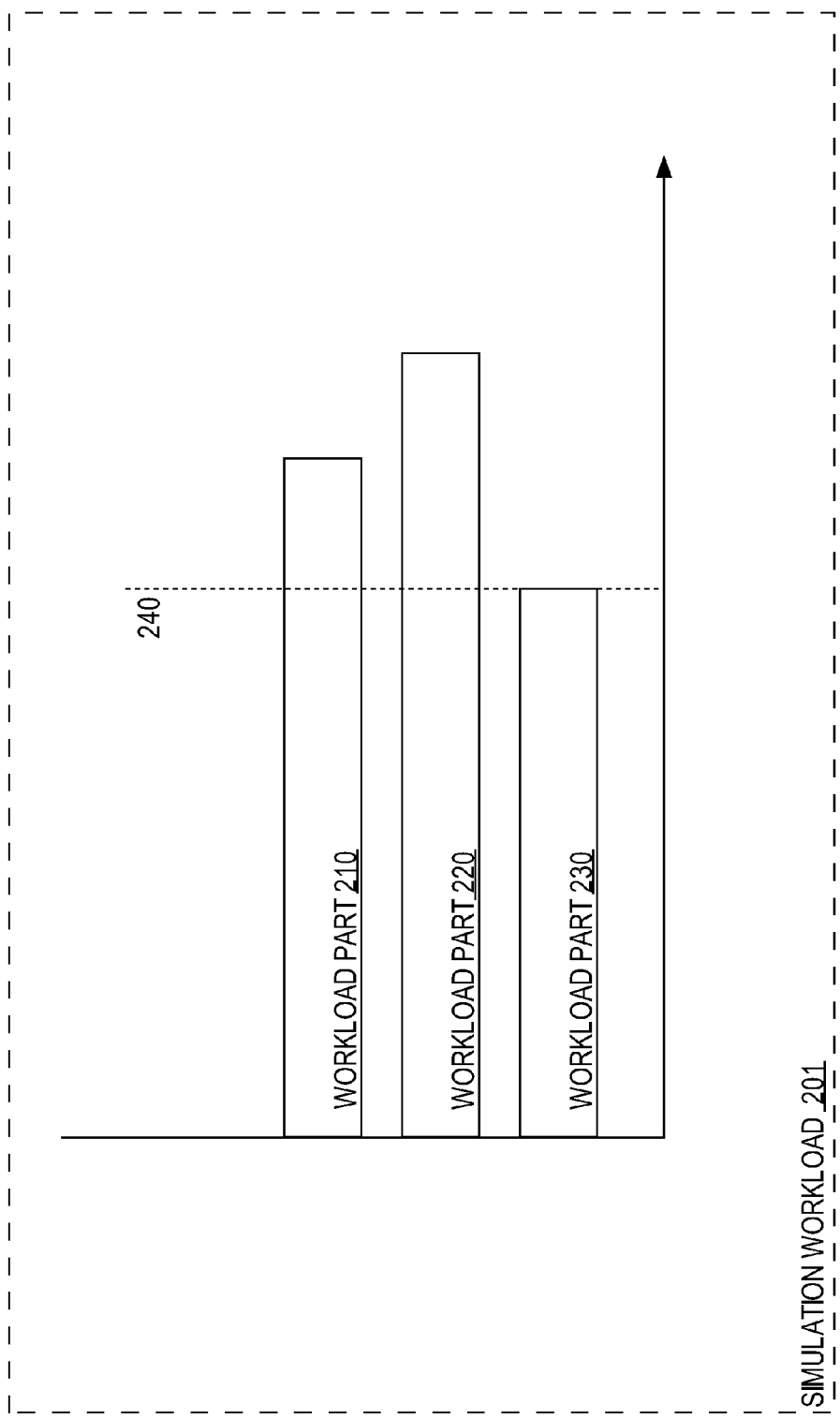
FIG. 2 is a block diagram illustrating an example simulation workload.

FIG. 2 is a block diagram illustrating an example simulation workload. Simulation workload 201 may be created to test a single test database server that is intended to replace a plurality of databases servers. Simulation workload 201 includes workload parts 210, 220, and 230. Workload parts 210, 220, and 230 are scheduled to begin replaying at the same time relative to a single replay database. Line 240 indicates the time at which the simulation workload 201 concludes replaying. Simulation workload 201 is scheduled to conclude replaying at the time at which workload part 230 concludes replaying. Alternatively, simulation workload 201 may have been scheduled to conclude replaying at the time at which any of the workload parts conclude replaying.

Workload parts 210, 220, and 230 may each be a portion of a workload capture that was captured by a different database server. That is, workload part 210 may be a portion of a workload capture that was captured by processes of a first database server, workload part 220 may be a portion of a workload capture that was captured by processes of a second database server, and workload part 230 may be a portion of a workload capture that was captured by processes of a third database server, where the first, second, and third database servers are each a different database server. One or more workload parts of workload parts 210, 220, and 230 may be an entire captured workload.

In an embodiment, workload part 210 may be portions of a workload capture that was captured by processes of a first group of database servers, workload part 220 may be portions of a workload capture that was captured by processes of a second group of database servers, and workload part 230 may be portions of a workload capture that was captured by processes of a third group of database servers. In yet another embodiment, workload parts 210, 220, and 230 may be portions of the same workload capture that was captured by processes of the same database server.

Simulation workload 201 may be used to test how a test database server performs when subjected to the load of three database servers, or alternatively how a grouping of database servers performs when subjected to the load of three database server groups. Workload part 210 may include a workload sent to a first database server in particular time interval, workload part 220 may include the workload sent to the second database server in the particular time interval, and workload part 230 may include the workload sent to the third database server in the particular time interval. The replay of simulation workload 201 relative to a test database server would simulate a consolidated workload to which the test database server would be subjected if the test subject were to replace the functions of the first, second, and third databases during the particular time interval. Performance metrics may be calculated during the replay of the simulation workload to determine whether the third database server is adequate to replace the functions of the first, second and third database server.

Figure 3:
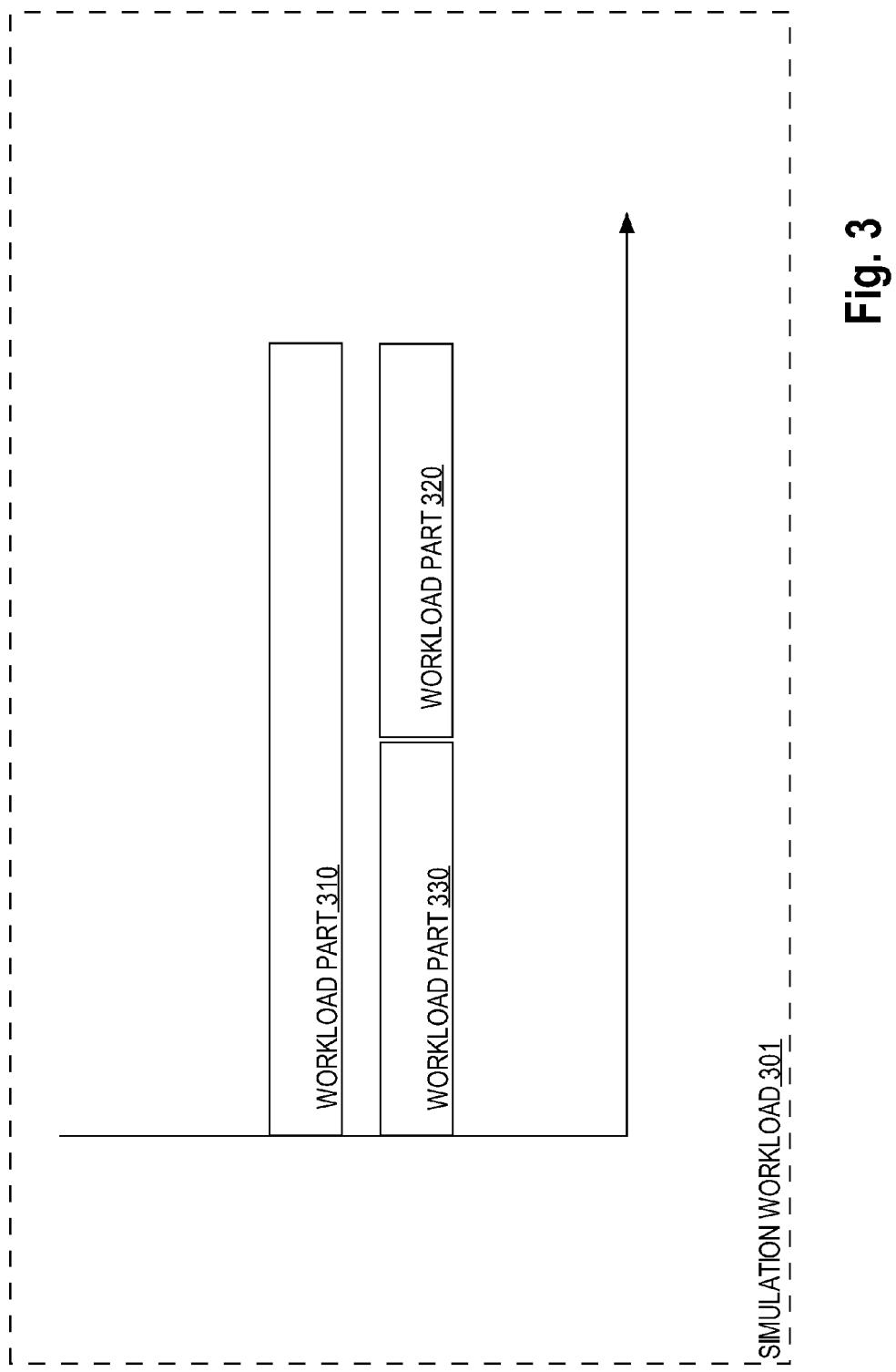
FIG. 3 is a block diagram illustrating another example simulation workload.

FIG. 3 is a block diagram illustrating another example simulation workload. Simulation workload 301 would test how a particular database server would perform if client browsing activity were to double. Workload part 310 is an entire captured workload. A filtered workload part is created based on workload part 310, by removing the capture information that corresponds to captured update requests. The capture information corresponding to captured update requests may be the information in workload part 310 that is only needed for replaying the captured update requests. A workload part such as workload part 310 may simulate a workload comprised only of queries and no updates.

The filtered workload is then split into two workload parts—workload parts 320 and 330, where workload part 320 includes workload information captured during the first half of the recording interval and workload part 330 includes workload information captured during the second half of the recording interval. Workload part 320 and 330 may each also include any additional capture information that is necessary for the replay of the workload information included in the respective workload parts. For example, workload part 330 may include session information that occurred before the second half of the recording interval but that is necessary to replay the workload included in workload part 330.

Simulation workload 301 indicates that workload parts 310, 320, and 330 are to be replayed against a single database system. Workload part 310 is to begin replaying at the same time as workload part 330. Workload part 320 is scheduled to begin replaying at the time that workload part 330 finishes playing. By replaying the filtered workload concurrently with the entire captured workload, the simulation workload simulates the doubling of browsing activity.

A replay of workload part 330 before workload part 320, which is different than the order of the workload parts as captured, allows for a more accurate assessment of how the replay database would perform if the browsing activity were to double. If workload part 320 was replayed concurrently with the first half of workload part 310, many requests would be replayed very close in time, thus causing the replay database system to return the results for the request from a cache. In reality, user requests are likely to be much more varied, and by swapping the order of the workload parts so that the second half of the captured workload is replayed before the first half of the captured workload, the simulation workload has the potential to better simulate an actual workload.

Furthermore, by scheduling to begin the replay of workload part 320 exactly at the time that workload part 330 concludes replaying, the simulation workload simulates exactly a doubling of the browsing activity, instead of any more or any less. If the replay of workload part 320 was to overlap for any period with the replay of workload 330, the simulated workload would be simulating more than double the browsing activity.

Simulation workload 301 may be scheduled to end replaying at the time that the first of workload parts 310 and 320 conclude replaying. By scheduling the end of the simulation workload replay in this manner, the entire replay simulates a doubling in browsing activity. If instead, the simulation workload was scheduled to end replaying at the time that the last of workload parts 310 and 320 completed, there may be a period of time during the replay of simulation workload 301 where only one workload part is replaying. For that period of time, the replay of the simulation workload 310 would not be simulating a double in browsing activity.

In an alternate embodiment, a simulation workload may replay workload part 310 concurrently with a filtered workload, rather than replaying workload part 330 before workload part 320. In an alternate embodiment, workload part 330 may be scheduled to begin at a particular clock time rather than at the time that workload part 320 concludes. Furthermore, in other embodiments, the filtered workload may be split up into a greater number of portions, and/or the resulting portions may be replayed in a different order. Other embodiments may schedule more than two parts to begin replaying concurrently.

Processing the Simulation Workload or Associated Dependency Information for the Prevention of Improper Dependencies In an embodiment, dependencies between workload units of a workload part are determined. A dependency indicates the order in which workload units must be replayed in order to ensure that the replay accurately simulates the corresponding workload units as captured. For example, there may be a dependency between workload unit A and workload unit B indicating that workload unit A may only be replayed after the replay of workload unit B.

In an embodiment, the process of determining dependencies includes determining which objects are modified or accessed by (i.e. "referenced by") a request captured in a particular workload unit. A dependency may be created between two workload units based on a determination that the two workload units reference the same particular object, and the workload unit of the two workload units which was captured first modified the particular object. For example, a captured workload may capture a first transaction consisting of an update to a table, and thereafter capture a second transaction that accesses the same table and reads a value from the table. In such a case, the workload unit corresponding to the table access must be replayed after the workload unit corresponding to the table update is replayed if the replay is to accurately duplicate the captured workload. Thus, based on a determination that (1) a first request captured in the first workload unit modifies a particular object and (2) a second workload unit includes a second request which was issued after the first request and accessed the particular modified object, a dependency may be created between the second workload unit and the first workload unit. Such dependencies may be referred to before or during the replay of the simulation workload, to ensure that the dependencies are satisfied at the time that the simulation workload is replayed.

In an embodiment, dependency information identifying one or more determined dependencies is stored in a workload, or otherwise in association with a workload. A data structure may be created to represent the determined dependencies. For example, the dependencies may be represented by a directed graph where each node of the graph represents workload units and the directed links between nodes indicate the order in which the workload units are to replay. Such dependency information may be referenced during replay to ensure that the dependencies are obeyed during the replay of the simulation workload. Workload unit dependencies may be included in the simulation workload or may be stored in association with the simulation workload.

In an embodiment, dependencies between workload units of a simulation workload are only to be enforced for workload units that are included in the same workload part. In other words, there should be no dependencies enforced across workload parts. In order to ensure that no such improper dependencies are enforced across workload parts, before replaying the simulation workload, the workload included in the simulation workload may need to be processed, or the dependency information associated with a simulation workload may need to be processed. Example scenarios that may cause the determination of an improper dependency across workloads or the enforcement of a non-dependency will now be discussed. Approaches for preventing such improper determination or improper enforcement will now be described.

Re-Labeling Workload Unit Identifiers

In an embodiment, the simulation workload is created after dependencies have already been determined for the workload parts included in the simulation workload. The dependency information created for the simulation workload may be created by combining together the dependency information determined for each of the workload parts. However, such an approach may create an undesired result if the dependency information for two different workload parts includes the same workload unit identifiers. For example, a dependency associated with workload part 1 may indicate that workload unit 1_3 must wait for workload unit 2_5, i.e. that before the third workload unit in Capture File 1 is replayed, the fifth workload unit in Capture File 2 must be replayed. A dependency associated with workload part 2 may indicate that workload unit 3_5 must wait for workload unit 2_5.

At replay time, because the two dependencies identify the same workload unit, i.e. workload unit 2_5, the replay of a workload unit 1_3 or 3_5 may be unnecessarily stalled or the dependency may be incorrectly enforced. For example, because the dependency indicator associated with workload part 2 indicates that workload unit 3_5 must wait for workload unit 2_5, the replay of workload unit 3_5 may be stalled until both the workload unit 2_5 of workload part 1 and workload unit 2_5 of workload part 2 are replayed. Such a situation would create unnecessary stalling and potentially even a deadlock. Alternately, workload unit 3_5 may wait for the wrong workload unit to finish replaying before beginning the replay of workload unit 3_5. For example, without a re-labeling of workload unit identifiers, workload unit 3_5 may only wait for workload unit 2_5 of workload part 1 to finish replaying, even though a proper enforcement of the dependency would require for workload unit 3_5 to wait for workload unit 2_5 of workload part 2 to finish replaying. Such a situation would cause an incorrect enforcement of the dependency.

In an embodiment, the enforcement of a non-dependency such as the one discussed above may be prevented by relabeling certain workload unit identifiers in the dependency information associated with one or more workload parts. For example, the workload unit identifiers referenced in the second dependency, associated with the second workload part, may be re-labeled to different workload unit identifiers, such as A and B. The workload unit identifiers would still identify the same workload units, i.e. workload unit A would identify the third workload unit in Capture File 2 and workload unit B would identify the fifth workload unit in Capture File 3. Workload unit identifier remapping information may be stored indicating the remapping, i.e. indicating that workload unit A identifies the third workload unit in Capture File 2 and workload unit B would identify the fifth workload unit in Capture File 3. Such remapping information may be referenced during the replay of the workload parts to determine which workload units the new workload identifiers identify.

Such a re-labeling of workload unit identifiers would ensure that, at replay time, the replay of workload unit B (i.e.

the fifth workload unit in Capture File 3) is only stalled until workload unit A has replayed (i.e. the fifth workload unit in Capture File 2, included in the second workload part), rather than being stalled until both 2_5 (i.e. the fifth workload unit in Capture File 2, included in the first workload part) and workload Unit A (i.e. the fifth workload unit in Capture File 2, included in the second workload part) has replayed. Thus, in an embodiment, the re-labeling of workload unit identifiers in the second workload part would prevent the enforcement of non-dependencies across workload parts as occurring during replay, but would only allow actual dependencies between workload units of the same workload part to occur.

In an embodiment, all of the workload unit identifiers included in the dependency information associated with a particular workload part is re-labeled. In other embodiments, only some workload unit identifiers in the dependency information associated with a particular workload part is re-labeled. The selection of particular workload unit identifiers that are to be re-labeled may be determined by determining which workload unit identifiers are included in two different dependency information sets, one set describing dependency information for one workload part and the other set describing dependency information for a second different workload part. In another embodiment, the selection of particular workload unit identifiers that are to be re-labeled may be determined by (1) determining which workload unit identifiers are included in two different dependency information sets, one set describing dependency information for one workload part and the other set describing dependency information for a second different workload part and (2) determining that at least some portion of the first workload part and some portion of the second workload parts are to replay concurrently.

Re-Labeling Object Identifiers

In an embodiment, workload unit dependencies are determined for the simulation workload as a whole. For example, the dependencies may be determined after the simulation workload has been created. As discussed above, dependencies between workload units may be determined by determining which objects are referenced by the requests included in the workload units. For example, a dependency may be created between two workload units based on a determination that the requests included in the two workload units reference the same particular object, and the workload unit of the two workload units which was captured first modified the particular object. The determination that two workload units reference the same particular object may be based, in part, on a determination that the two workload units include the same particular object identifier. An object identifier included in a workload unit identifies a particular table that is referenced by the workload unit.

When dependencies are determined for the simulation workload, an approach for determining dependencies based on object identifiers may cause a dependency across workload parts to be determined if two different workload parts include workload units that reference the same object identifier. This would be an improper dependency, because as discussed above, there should not exist any dependencies across workload parts. In an embodiment, the determination of improper dependencies may be prevented by re-labeling one or more object identifiers referenced by workload units identified in one or more workload parts. For example, a first workload part and a second workload part may both include workload units that reference the same object identifiers. The first workload part may be modified so that instances of any commonly-occurring object identifier occurring within the workload of the first workload part are replaced by another object identifier that identifies the same object as the commonly-occurring object identifier. In an embodiment, if dependencies are determined after the object identifiers in the first workload part are relabeled, no dependencies would be determined across the two workload parts because the two workload parts do not include any common object identifiers.

Object identifier remapping information may be stored indicating that the new object identifier which has replaced instances of the re-labeled object refers to the same object as the re-labeled object identifiers. This data may be referred to during the replay of the simulation workload to ensure that when the relevant workload units are replayed, the appropriate objects are referenced.

In an embodiment, the above-discussed re-labeling only occurs for a particular workload part if a portion of the workload part is scheduled to be replayed concurrently with the replay of another workload part. In another embodiment, the remapping only occurs for a particular workload part if (1) a portion of the workload part is scheduled to be replayed concurrently with the replay of another workload part and (2) the overlapping workload parts reference one or more of the same objects. In an embodiment, each object identifier included in a workload part is re-labeled. In another embodiment, only some of the objects identifiers included in a workload unit are re-labeled. For example, it may be determined that a first workload part and a second workload part are to be replayed concurrently according to a particular simulation workload, and that a first workload part includes three object identifiers that are also included in the second workload part. In response to this determination, each of the object identifiers of the first workload part may be re-mapped or only the three commonly-shared object identifiers may be re-mapped.

Simulation Workload Replay

In an embodiment, the simulation workload is replayed. The simulation workload may be replayed after the simulation workload has been created and been processed for the determination of workload unit dependencies. Re-labeling of object identifiers or workload unit identifiers may also have occurred prior to the replay of the simulation workload. In an embodiment, the workload contained in the workload parts of the simulation workload may also be processed for another purpose prior to replay. The workload parts of the simulation workload are the workloads parts identified by the simulation workload.

Figure 4:
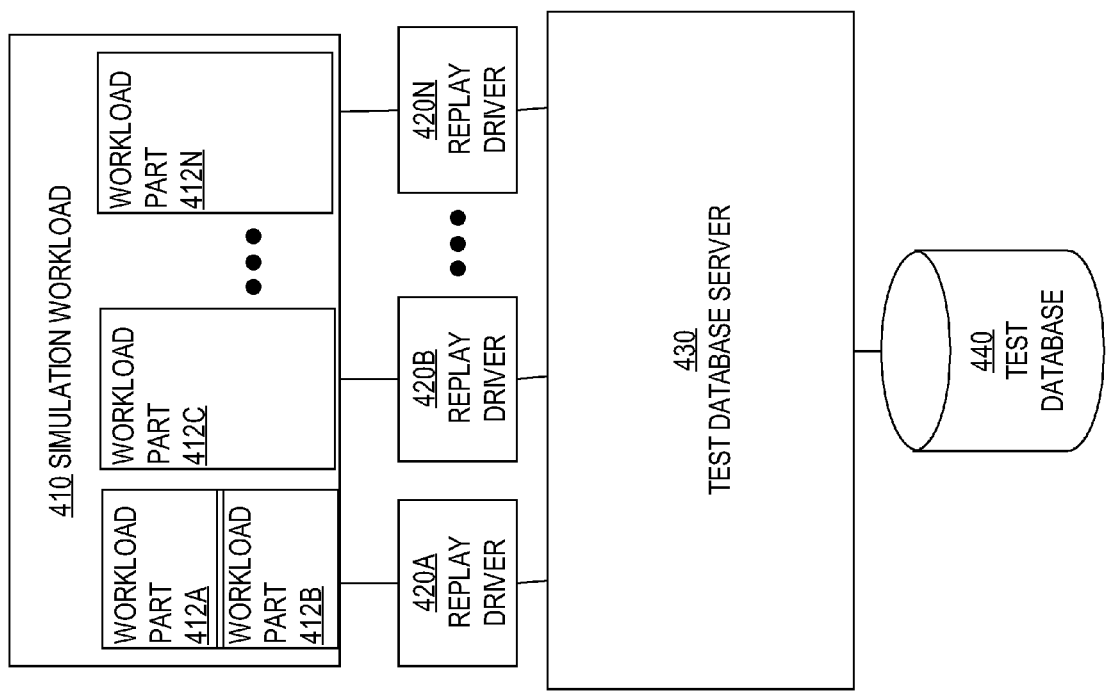
FIG. 4 is a block diagram illustrating an example system in which a simulation workload is replayed to a test database server, according to an embodiment.

FIG. 4 is a block diagram illustrating an example system in which a simulation workload is replayed to a test database server, according to an embodiment. Simulation workload 410 is a simulation workload that is to be replayed to test database server 430. Simulation workload 410 includes workload parts 412A-N. Workload parts 412A-N may each be portions of different capture files captured by processes of different database servers. The positioning of workload part 412A and 412B indicates that workload parts 412A and B are scheduled to begin replaying at the same time.

Replay drivers 420A-N simulate the application servers that originally sent the workload corresponding to the workload contained in workload parts 412A-N. Replay drivers 420A-N simulate the application servers by replaying the workload captured in workload parts A-N. In an embodiment, a replay driver replays a workload part by reading the workload contained in the workload part and sending the workload that is read to test database server 430. The replay driver may be executable code that causes the workload contained in the workload parts to be read and the workload that is read to be sent to test database server 430. Replay drivers 420A-N may collectively cause the entire workload of simulation workload 410, i.e. the entire workload contained in the workload parts 412 A-N to be replayed. Replay drivers 420A-N may cause workload to be sent to test database server 430 that is different than the workload as originally received by the capture database, but which causes the same functionality to be performed by test database server 430 as the capture database server that received the workload at capture time.

In one embodiment, replay drivers 420A-N synchronize the sending of workload units to test database server 430 so that the differences in time between the test database server's receipt of those workload units corresponds to the differences in time between the capture database server's previous receipt of those same workload units during the recording interval. Thus, in one embodiment of the invention, the duration of the interval of time during which replay drivers 420A-N send workload to test database server 430 is identical to the duration of the interval of time during which the clients of the capture database server sent that same workload to the capture database server.

A replay driver may replay a single workload part or may replay multiple workload parts. A workload part may be replayed by a single replay driver or multiple replay drivers. There may not be an even distribution in the assignment of workload parts to replay drivers. For example, one replay driver may be the only replay driver replaying multiple workload parts of a particular workload whereas two replay drivers may replay the same workload part.

The assignment of replay drivers to workload parts may be determined based on the load of the workload contained in the workload parts. A particular workload part may be analyzed to determine the amount of processing power that is necessary to replay the workload such that that the replayed workload accurately simulates the concurrency of the captured workload. The number of replay drivers that are assigned to a workload part may be a function of the amount of processing power needed to accurately replay the workload contained in the workload part. As an example, one workload part may comprise workload captured at a first database server and a second workload part may comprise workload captured at a second database server. The first database server may receive three times the amount of requests in a particular interval of capture time as compared to the second database server. Due to the difference in load, the first workload part may require three replay drivers for an accurate replay of the first workload part and the second workload part may require only a single replay driver for an accurate replay of the second workload part.

In an embodiment, replay drivers 420A-N replay the workload stored in workload parts 412 A-N to test database server 430 in a manner that preserves all dependencies that exist between the workload units of workload parts 412 A-N. That is, if some dependency information indicates that a first workload unit of a workload part must occur before a second workload unit of the workload part, database server replays the first workload unit before the second workload unit. During the replay, one or more replay drivers may refer to workload unit identifier remapping information to determine which workload unit is identified by a particular workload unit identifier.

The simulation workload may be replayed in accordance with one or more limitations associated with the simulation workload. For example, a simulation workload may indicate an ordering of the workload parts, and the replay of the workload parts occurs in the order indicated by the simulation workload. For example, a simulation workload 410 indicates that the replay of workload part 412A and 412B is to begin at the same time. Thus, the replay driver associated with workload parts 412 A and 412B would begin the replay of workload parts 412 A and 412B at the same time.

The simulation workload may also indicate a time at which a workload part is to begin or end replaying, and the replay of the workload part may begin only at the time or condition indicated by the limitation. For example, workload part 412C may be scheduled to begin replaying at the time that workload part 412A ends replaying. Accordingly, the replay of workload part 412C would occur only after workload part 412A ends replaying. As another example, workload part 412C may be scheduled to begin replaying at 10 minutes after the time at which the replay of simulation workload 410 begins. Accordingly, the replay of workload part 412C would occur at 10 minutes after the time at which the replay of simulation workload 410 begins.

The simulation workload may also indicate limitations within workload parts. For example, a workload part may indicate that one set of workload units included in the workload part are to be replayed before another set of workload units included in the workload part. The replay process would adhere to such limitations and would replay the workload units of the workload part according to the ordering indicated by the simulation workload.

Collection and Comparison of Performance Data

Performance data may be collected about the replay of the simulation workload. Such performance data may be compared against the performance data collected about one or more captured workloads. The performance data collected about the replay of the simulation workload may describe the simulation workload as a whole or may be specific to a particular workload part of the simulation workload or to a particular workload unit of the simulation workload. The performance data collected about one or more captured workloads may be about a particular workload unit, a particular portion of the captured workload, or an entire captured workload.

Performance data collected about the captured workload and/or the simulation workload may, for example, indicate information about disk response times at the database server, CPU (Central Processing Unit) utilization at the database server, wait events, errors, and time model statistics. Performance data may be collected by capture processes at capture time and by replay drivers, e.g. replay driver 420A-N, at replay time. The performance data gathered at capture time may be stored in a capture file which contains the captured workload. Performance information collected by the capture processes, describing the performance of the captured workload, may be compared against performance information collected by replay drivers, which describes the performance of the replayed simulation workload.

In an embodiment, the collected performance data is collected or aggregated per workload part basis. That is, the performance data may only describe the performance of a particular workload part. Determining performance information for a workload part may include, for one or more workload units, determining the performance of the workload unit and also determining to which workload the workload unit belongs.

The information collected about the performance of a particular workload unit may be stored in association with a workload identifier identifying the workload unit described by the collected information. The workload part, to which the workload unit belongs, may be determined based on the workload identifier. For example, the amount of time taken to complete the execution of a particular workload may be determined. The execution time may be stored in association with a workload identifier of 4_5, indicating that the workload unit to which the performance information pertains is the fifth call in capture file 4.

After determining the workload unit whose performance is described by the performance information, the workload unit identifier identifying the workload unit may be cross-referenced with workload identification information. Each workload part may be associated with some workload identification information which identifies the workload units included in the workload part. For example, there may be workload identification information that indicates that a particular workload part includes workload identifiers 3_2, 4_5, 4_2, and 5_3. By comparing the workload identifier for which the performance data was collected against the workload identification information associated with one or more workload parts, it may be determined to which workload part(s), the workload unit in question belongs.

As a result of such determination, the performance statistic for the particular workload unit may be attributed to the workload part(s) to which the particular workload unit belongs. Attributing the performance statistic for a particular workload unit to a particular workload part may comprise updating an aggregate value that indicates aggregate performance statistics for the workload unit. For example, an average execution time value associated with workload part 2 may be updated in response to (1) locating workload identifier 4_5 in the workload identification associated with workload part 2 and thus determining that workload identifier 4_5 belongs to workload part 2 and (2) determining that the execution time for a particular instance of workload unit 4_5 is 0.5 milliseconds. Evaluating the performance of an entire workload may comprise evaluating an aggregate performance statistic value that is an aggregate of values assigned to individual workload parts or workload units.

The performance of a replayed simulation workload may be compared against the performance of a captured workload. In an embodiment, the performance of a particular workload part of a simulation workload is compared against the performance of a portion of a captured workload corresponding to the particular workload part. The corresponding captured workload portion may be the particular portion of the workload that the workload part intended to simulate. By comparing the performance statistics, one can learn how the workload contained in the workload unit is handled by the database server in an environment such as the one simulated by the simulation workload. For example, if the simulation workload simulates a consolidated workload for the purpose of testing a new database server, comparing the performance of the workload part with the performance of the corresponding captured workload portion would indicate if the quality of service would suffer if the new database server was used as a consolidated database server. As another example, if a simulation workload is to simulate a doubling of browsing activity, the performance of a particular workload unit, particular workload part, or the entire simulation workload may be analyzed to determine whether the performance statistics satisfy a predetermined performance standard. The performance may be analyzed in isolation or in comparison to the performance of workload unit(s) or workload portion(s) of a capture file, or the performance of an entire capture file.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
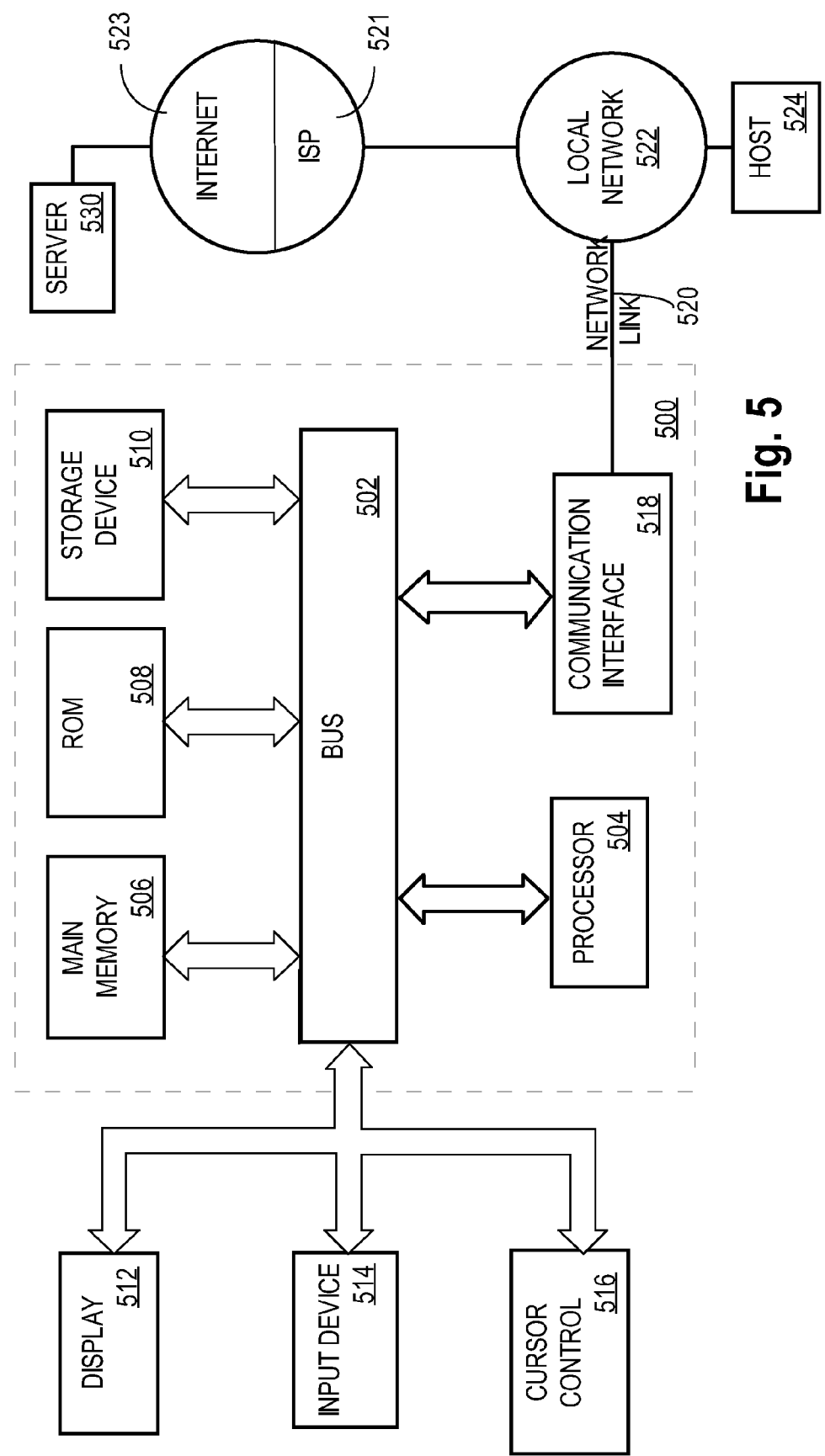
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 521. ISP 521 in turn provides data communication services through the world wide packet data communication network now commonly referred to as the "Internet" 523. Local network 522 and Internet 523 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 523, ISP 521, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising steps of:
    determining dependency information for a first workload part that is a portion of a first workload executed relative to a first capture database server of a first database and a second workload part that is a portion of a second workload executed relative to a second capture database server of a second database different than said first database, wherein the dependency information indicates at least one workload unit in the second workload part depends on at least one workload unit in the first workload part even though the first workload part was executed independent of the second workload part;
    determining a simulation workload identifying a plurality of workload parts including the first workload part and the second workload part;
    after determining the dependency information and determining the simulation workload, determining modified dependency information associated with the simulation workload by, at least in part, modifying particular dependency information associated with a particular workload part of the plurality of workload parts to no longer indicate that the at least one workload unit in the second workload part depends on the at least one workload unit in the first workload part;
    replaying, to a single database server, the simulation workload according to the modified dependency information;
    wherein replaying the simulation workload comprises replaying at least a portion of the first workload part and a portion of the second workload part concurrently; and
    wherein the steps are performed by one or more computing devices.

2. The method of claim 1, wherein the simulation workload indicates that the first workload part and the second workload part are to begin replaying at a same time.

3. The method of claim 1, wherein the simulation workload indicates that the replaying of the simulation workload is to conclude at a time that a replay of a certain workload part concludes.

4. The method of claim 1, wherein the simulation workload indicates that the replaying of the simulation workload is to conclude at a time that a certain workload part of a set of workload parts concludes replaying, wherein the set of workload parts is a subset of the plurality of workload parts, and wherein the simulation workload indicates the certain workload part concludes replaying before any other workload part of said set of workload parts.

5. The method of claim 1, wherein prior to replaying the simulation workload, the dependency information is modified at least by replacing each of one or more original workload unit identifiers included in dependency information with a respective different workload unit identifier.

6. The method of claim 1, further comprising:
determining a workload part performance value describing a performance of a certain workload part of the plurality of workload parts, wherein determining the workload part performance value comprises determining which workload part includes a particular workload unit, wherein a workload unit performance value describing a performance of the particular workload unit is collected.

7. A method comprising steps of:
determining dependency information for a first workload part and a second workload part, wherein the dependency information indicates at least one workload unit in the second workload part depends on at least one workload unit in the first workload part;
determining a simulation workload identifying a plurality of workload parts including the first workload part and the second workload part;
after determining the dependency information and determining the simulation workload, determining modified dependency information associated with the simulation workload by, at least in part, modifying particular dependency information associated with a particular workload part of the plurality of workload parts to no longer indicate that the at least one workload unit in the second workload part depends on the at least one workload unit in the first workload part;
replaying, to a database server, the simulation workload according to the modified dependency information;
wherein the simulation workload indicates that the first workload part is to be replayed before the second workload part and after the second workload part, wherein the second workload part was executed relative to a capture database server before the first workload part was executed relative to the capture database server; and
wherein the steps are performed by one or more computing devices.

8. The method of claim 7, wherein the simulation workload indicates that a third workload part of the plurality of workload parts and a fourth workload part of the plurality of workload parts are to begin replaying at a same time.

9. The method of claim 7, wherein the simulation workload indicates that the replaying of the simulation workload is to conclude at a time that a replay of a certain workload part concludes.

10. The method of claim 7, wherein the simulation workload indicates that the replaying of the simulation workload is to conclude at a time that a certain workload part of a set of workload parts concludes replaying, wherein the set of workload parts is a subset of the plurality of workload parts, and wherein the certain workload part is the first workload part to conclude replaying of the set of workload parts.

11. The method of claim 7, wherein prior to replaying the simulation workload, the dependency information is modified at least by replacing each of one or more original workload unit identifiers included in dependency information with a respective different workload unit identifier.

12. The method of claim 7, further comprising:
determining a workload part performance value describing a performance of a certain workload part of the plurality of workload parts, wherein determining the workload part performance value comprises determining which workload part includes a particular workload unit, wherein a workload unit performance value describing a performance of the particular workload unit is collected.

13. One or more non-transitory computer-readable storage media storing instructions which, when executed by a set of one or more computing devices, causes the set of one or more computing devices to perform:
determining dependency information for a first workload part that is a portion of a first workload executed relative to a first capture database server of a first database and a second workload part that is a portion of a second workload executed relative to a second capture database server of a second database different than said first database, wherein the dependency information indicates at least one workload unit in the second workload part depends on at least one workload unit in the first workload part even though the first workload part was executed independent of the second workload part;
determining a simulation workload identifying a plurality of workload parts including the first workload part and the second workload part;
after determining the dependency information and determining the simulation workload, determining modified dependency information associated with the simulation workload by, at least in part, modifying particular dependency information associated with a particular workload part of the plurality of workload parts to no longer indicate that the at least one workload unit in the second workload part depends on the at least one workload unit in the first workload part;
replaying, to a single database server, the simulation workload according to the modified dependency information;
wherein replaying the simulation workload comprises replaying at least a portion of the first workload part and a portion of the second workload part concurrently.

14. The one or more non-transitory computer-readable storage media of claim 13, wherein the simulation workload indicates that the first workload part and the second workload part are to begin replaying at a same time.

15. The one or more non-transitory computer-readable storage media of claim 13, wherein the simulation workload indicates that the replaying of the simulation workload is to conclude at a time that a replay of a certain workload part concludes.

16. The one or more non-transitory computer-readable storage media of claim 13, wherein the simulation workload indicates that the replaying of the simulation workload is to conclude at a time that a certain workload part of a set of workload parts concludes replaying, wherein the set of workload parts is a subset of the plurality of workload parts, and wherein the simulation workload indicates the certain workload part concludes replaying the before any other workload part of said set of workload parts.

17. The one or more non-transitory computer-readable storage media of claim 13, wherein the one or more non-transitory computer-readable storage media store further instructions which, when executed by the set of one or more computing devices, causes the set of one or more computing devices to further perform, prior to replaying the simulation workload, the dependency information is modified at least by replacing each of one or more original workload unit identifiers included in dependency information with a respective different workload unit identifier.

18. The one or more non-transitory computer-readable storage media of claim 13, wherein the one or more non-transitory computer-readable storage media store further instructions which, when executed by the set of one or more computing devices, causes the set of one or more computing devices to further perform:

determining a workload part performance value describing a performance of a certain workload part of the plurality of workload parts, wherein determining the workload part performance value comprises determining which workload part includes a particular workload unit, wherein a workload unit performance value describing a performance of the particular workload unit is collected.

19. One or more non-transitory computer-readable storage media storing instructions which, when executed by a set of one or more computing devices, causes the set of one or more computing devices to perform:

determining dependency information for a first workload part and a second workload part, wherein the dependency information indicates at least one workload unit in the second workload part depends on at least one workload unit in the first workload part;

determining a simulation workload identifying a plurality of workload parts including the first workload part and the second workload part;

after determining the dependency information and determining the simulation workload, determining modified dependency information associated with the simulation workload by, at least in part, modifying particular dependency information associated with a particular workload part of the plurality of workload parts to no longer indicate that the at least one workload unit in the second workload part depends on the at least one workload unit in the first workload part;

replaying, to a database server, the simulation workload according to the modified dependency information;

wherein the simulation workload indicates that the first workload part is to be replayed before the second workload part and after the second workload part, wherein the second workload part was executed relative to a capture database server before the first workload part was executed relative to the capture database server.

20. The one or more non-transitory computer-readable storage media of claim 19, wherein the simulation workload indicates that a third workload part of the plurality of workload parts and a fourth workload part of the plurality of workload parts are to begin replaying at a same time.

21. The one or more non-transitory computer-readable storage media of claim 19, wherein the simulation workload indicates that the replaying of the simulation workload is to conclude at a time that a replay of a certain workload part concludes.

22. The one or more non-transitory computer-readable storage media of claim 19, wherein the simulation workload indicates that the replaying of the simulation workload is to conclude at a time that a certain workload part of a set of workload parts concludes replaying, wherein the set of workload parts is a subset of the plurality of workload parts, and wherein the certain workload part is the first workload part to conclude replaying of the set of workload parts.

23. The one or more non-transitory computer-readable storage media of claim 19, wherein the one or more non-transitory computer-readable storage media store further instructions which, when executed by the set of one or more computing devices, causes the set of one or more computing devices to further perform, prior to replaying the simulation workload, the dependency information is modified at least by replacing each of one or more original workload unit identifiers included in dependency information with a respective different workload unit identifier.

24. The one or more non-transitory computer-readable storage media of claim 19, wherein the one or more non-transitory computer-readable storage media store further instructions which, when executed by the set of one or more computing devices, causes the set of one or more computing devices to further perform:

determining a workload part performance value describing a performance of a certain workload part of the plurality of workload parts, wherein determining the workload part performance value comprises determining which workload part includes a particular workload unit, wherein a workload unit performance value describing a performance of the particular workload unit is collected.

\* \* \* \* \*

UNITED STATES PATENT AND TRADEMARK OFFICE
CERTIFICATE OF CORRECTION

| | | |
|---|---|---|
| PATENT NO. | : 8,954,397 B2 | Page 1 of 1 |
| APPLICATION NO. | : 13/538278 | |
| DATED | : February 10, 2015 | |
| INVENTOR(S) | : Wang et al. | |

It is certified that error appears in the above-identified patent and that said Letters Patent is hereby corrected as shown below:

In the drawings,

On sheet 1 of 5, in FIG. 1, under reference numeral 120, line 2, delete "IINFORMATION" and insert -- INFORMATION --, therefor.

In the specification,

In column 13, line 34, delete "that that" and insert -- that --, therefor.

In the claims,

In column 20, line 54, in claim 16, after "replaying" delete "the".

Signed and Sealed this
Seventeenth Day of November, 2015

Michelle K. Lee
*Director of the United States Patent and Trademark Office*